United States Patent
Kritchman

(12) 
(10) Patent No.: US 6,519,038 B1
(45) Date of Patent: Feb. 11, 2003

(54) PROCESS FOR DYING MATERIAL TO MATCH A PREDETERMINED COLOR

(76) Inventor: Jerold Kritchman, 18164 Laurel Leaf La., Tequesta, FL (US) 33469

( * ) Notice: Subject to any disclaimer, the term of this patent is extended or adjusted under 35 U.S.C. 154(b) by 0 days.

(21) Appl. No.: 09/702,269

(22) Filed: Oct. 30, 2000

(51) Int. Cl.[7] .................................................. G01J 3/46
(52) U.S. Cl. ...................................... 356/425; 356/402
(58) Field of Search ................................ 356/425, 402, 356/405; 602/58; 604/304

(56) References Cited

U.S. PATENT DOCUMENTS

| | | | |
|---|---|---|---|
| 4,887,906 A | | 12/1989 | Koehler |
| 4,909,632 A | | 3/1990 | McFarlane |
| 5,082,529 A | * | 1/1992 | Burk ........................... 162/198 |
| 5,668,633 A | * | 9/1997 | Cheetam et al. ............. 356/402 |
| 6,052,195 A | * | 4/2000 | Mestha et al. ............... 250/226 |

* cited by examiner

Primary Examiner—F. L. Evans
Assistant Examiner—Roy M Punnoose

(74) Attorney, Agent, or Firm—McHale & Slavin

(57) ABSTRACT

The instant invention is a process for dying a-non-skin material to match an individual's skin tone. The skin is scanned by any color measuring device which digitalizes the color value and imputes that value into a computer based software program. The software program compares the individual's color value to a-digitalized predetermined library of colorants and a-digitalized predetermined library of non-skin materials. The program considers such things as the properties of the non-skin material to-determine a colorant mix. The colorant mix consists of the particular colorants needed and the quantity of each colorant needed to formulate a color match. The data for the color match is transferred to a computer controlled pumping mixing system which produces the amount of color match needed. The non-skin material is dyed and dried. To ensure that the dyed non-skin material matches the individual's skin tone, the dried non-skin material is then scanned by the color measurement device, given a non-skin material color value, digitalized, and imputed into the software program. The digital non-skin material color value is compared to the individual's color value. If the two values are within an acceptable predetermined range, then the dyed product is finished, if not the dyed product is rejected.

18 Claims, 3 Drawing Sheets

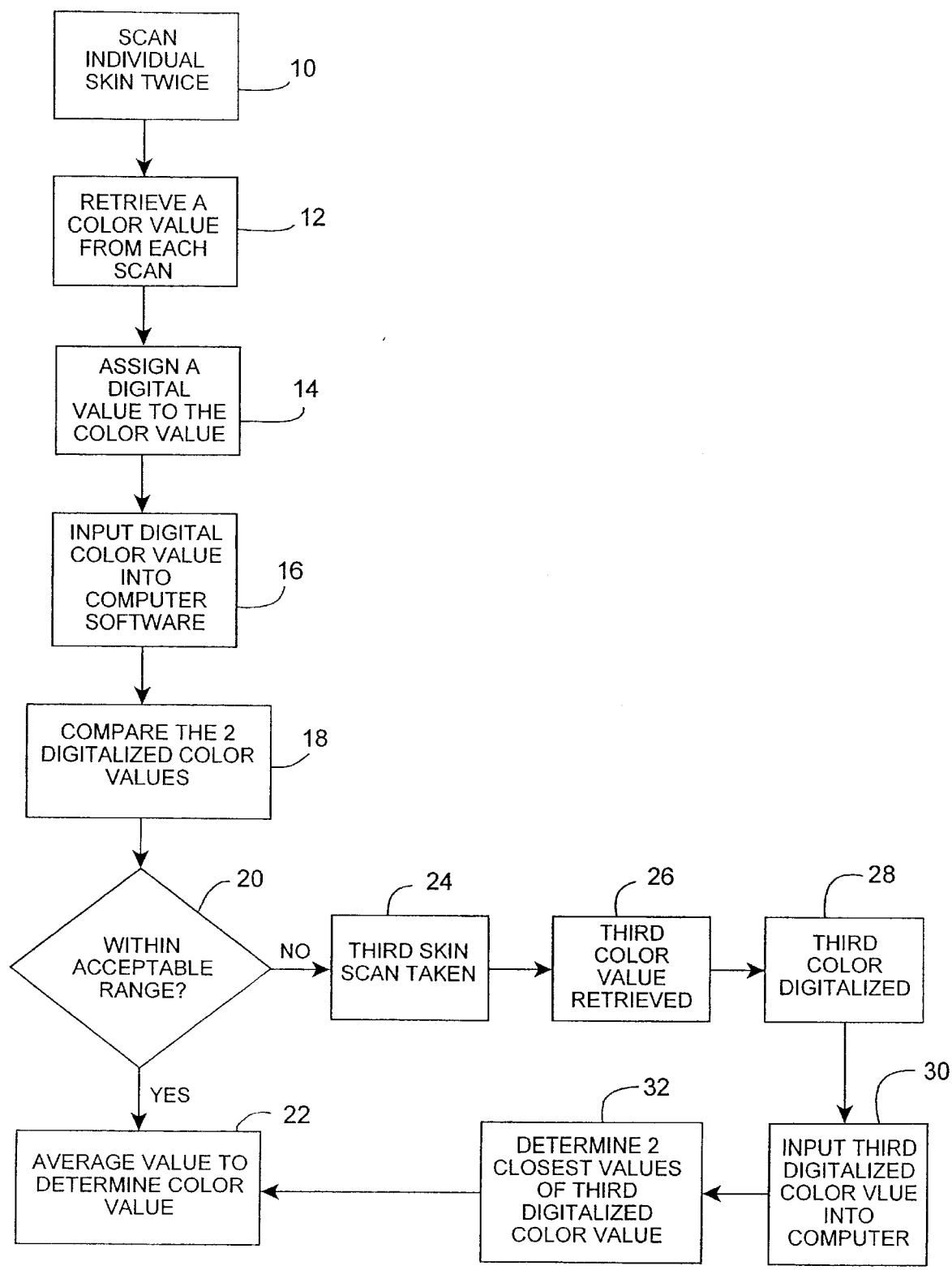
FIG. 1, page 1

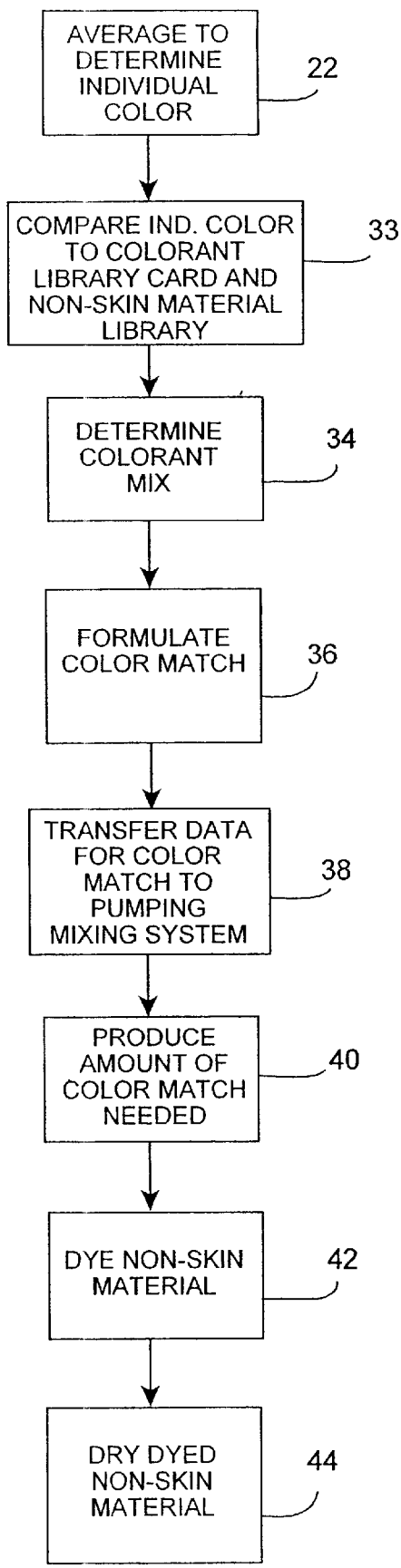
FIG 1, page 2

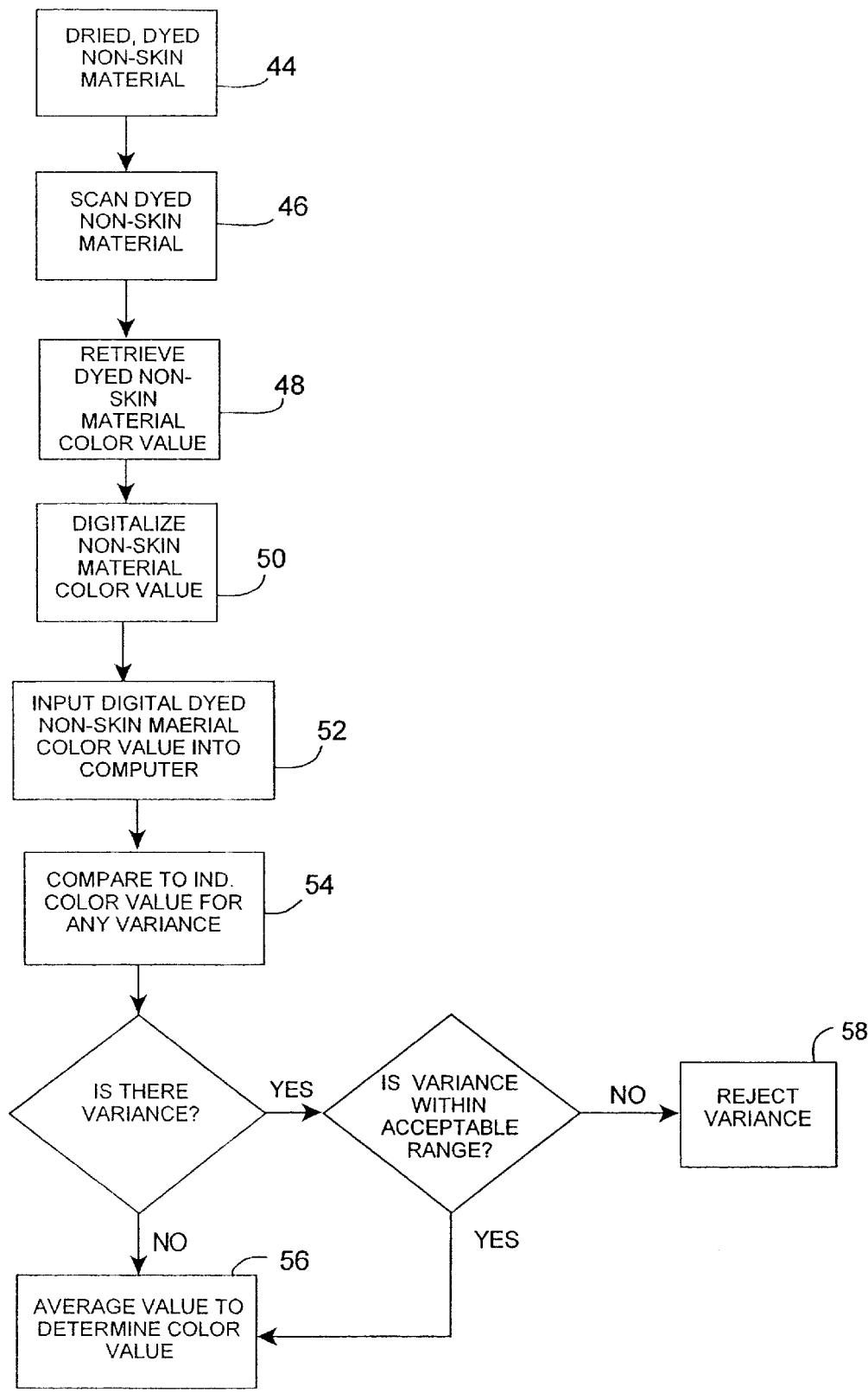
FIG. 1, page 3

PROCESS FOR DYING MATERIAL TO MATCH A PREDETERMINED COLOR

FIELD OF THE INVENTION

This invention relates generally to a process for matching non-skin material to skin tone and more particularly to a process that scans the skin and then electronically determines a colorant mix for dying non-skin material to match an individual's skin tone.

BACKGROUND OF THE INVENTION

Trauma to an individual's body can result in permanent disfigurement. Should the disfiguration reside on an exposed body part then psychological as well as physiological damage can occur. For example, if a burn victim suffers severe scars on an arm or hand, body parts commonly exposed, the burn victim can be subjected to constant scrutiny from the public in addition to the permanent reminder of the trauma. An individual who has experienced severe trauma to an arm or leg that has left a prominent scar is, also, exposed to the same intense scrutiny from the public.

Attempts to cover these areas, such as an ace bandage, will often produce unwanted questions and reminders of the trauma, something most scar victims wish to avoid. In addition, covering the area is often not aesthetically pleasing to the user. Further, individuals needing prosthesis must be content with the pre-manufactured skin tone closest to theirs instead of an exact match. Thus, if non-skin material such as an elastic wrap, plastic, textiles, latex, rubber, etc., could be dyed to match an individual's skin tone, the dyed non-skin material, which would blend with the individuals normal skin tone, could be used to cover the unsightly appearance of scars, burns, etc. As result, the non-skin material would be virtually unnoticeable except under close scrutiny. Thus, what is needed is a process for dying a non-skin material to exactly match an individual's skin tone.

DESCRIPTION OF THE PRIOR ART

U.S. Pat. No. 4,887,906 discloses a color match predictability system and method. The system and method allow a user to analyze which one of many possible formulation of colorants will produce the best color match.

U.S. Pat. No. 4,909,632 discloses a method for selecting personal compatible colors. The method uses a spectrophotometer to determine the color temperature of the skin of the user then a determination of the classification within a category in which the color temperature falls is made.

SUMMARY OF THE INVENTION

The instant invention is a process for dying a non-skin material to match an individual's skin tone. The individual's skin is scanned by any device which can measure color. Preferable color measuring devices are optical measuring devices such as, but not limited to, a spectrophotometer, densimeter, or colorimeter. In the preferred embodiment, a SP64 Spectrophotometer will be utilized. After being scanned, the retrieved color value of the skin tone is digitalized and automatically uploaded into an electronically coupled computer based software program. Alternatively, the color value may be uploaded manually.

The computer contains a software program for comparing the individual color value to a predetermined library of colorant values and predetermined library of non-skin material values to determine a colorant mix. The library of colorant values is composed of pre-scanned inks, dyes, or similar colorants. After being scanned, each colorant is assigned a colorant value which is digitalized and stored in the colorant library. The library of non-skin material is composed of pre-scanned non-skin material such as textiles, plastics, elastic, velcro, latex, rubber, etc. After being scanned, each non-skin material is assigned a non-skin material color value which is digitalized and stored in the non-skin material library.

An algorithm within the software then compares the individual's color value with the colorant value and the non-skin material color value to determine the mix of colorants necessary to match the individual's skin tone. The mix of colorants is used to formulate a color match. The data for the color match is transferred to an electronically coupled computer controlled pumping mixing system such as a Fluid Management/Miller Accutiner 3200 though any similar computer controlled system may be used. The computer controlled system produces that amount of color match needed, taking into account the color and non-linear fluid properties of the colorants, to dye the non-skin material. The non-skin material is than dyed.

After the dyed non-skin material drys, the dyed non-skin material is scanned and given a dyed non-skin material color value. The dyed non-skin material color value is compared to the individual's color value to determine if there is any variance. If there is any variance it must be within an acceptable predetermined statistical range, such as plus or minus five percent.

Accordingly, it is an objective of the instant invention to disclose a process for dying a material to match a chosen color.

It is a further objective of the instant invention to disclose a process for dying non-skin material to match an individual's skin tone.

It is yet another objective of the instant invention to disclose a process for electronically determining an exact color match to a scanned color for producing a colorant mix for a dye used to dye a material.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 1 depicts a flow chart of the process.

DETAILED DESCRIPTION OF THE INVENTION

Initially, an individual is assigned a user code. In the preferred embodiment, the code consists of the client first name and the last four digits of their phone number although any combination of letters or numbers may be used. A client file is then created in an Internet server.

Now referring to FIG. 1, depicted is a flow chart of the process. First, the individual's skin is scanned 10 by a color measuring device. In the preferred embodiment, the skin is scanned twice. Preferably the color measuring device is an optical measurement for example, but not limited to, a spectrophotometer, densitometer, or a colorimeter. In the preferred embodiment, a SP64 spectrophotometer, manufactured by X-Rite, Inc., is used. The SP64 spectrophotometer is a handheld, lightweight, portable sphere spectrophotometer designed to give fast precise and accurate color measurement information. The SP64 is available with an option in which data can be uploaded and/or downloaded via a bi-directional communications link to computer software.

Briefly, a spectrophotometer measures color by directing light at the color sample. The light then passes into the spectrophotometer where its color spectrum is analyzed and converted into data. The output from the spectrophotometer may be a series of standard digital output signals. These digital signals will relate the amount of measured light energy associated with a plurality of wave lengths across the visible spectrum from ultraviolet to blue, green, yellow, red, etc.

Many different color notation and specification systems are available. The most common being the Commission Internationale de l'Eclairage (CIE) System. The CIE color notation system uses three unique color stimulus specifications which are generally referred to as tristimulus values. These tristimulus values represent a mathematical transformation from the inconvenient mixed relationships of a set of three primaries. The tristimulus values, usually denoted as X, Y, and Z, can be used to accurately specify any desired color.

The scanner retrieves a color value 12. Preferably there is two values from scanning the individual twice. The color value is assigned a digital color value 14. The digital color value is automatically uploaded into an electronically coupled computer based software program 16. In an alternative embodiment, the color value is not digitalized but is manually programmed into a computer based software program.

The software program compares the two digital color values 18. If the values are within an acceptable predetermined statistical range 20, then the values are averaged to an individual color value 22. For example, an acceptable range may be a plus or minus five percent. If the values are not within the acceptable predetermined statistical range, then a third skin scan is taken 24. A third color value is retrieved 26, digitalized 28, and uploaded into the computer based software program 30. The two closest values from among the three digital color values will be selected 32. The software program will average the two selected digital color values to determine an individual color value 22.

The individual color value is compared to a predetermined library of colorants and a predetermined library of non-skin material 33. The colorant library is comprised of pre-scanned inks, dyes, and similar colorants. Such inks, dyes, and similar colorants are well known to those skilled in the art Each color is assigned a colorant value, digitalized, and stored in the colorant library. The non-skin material library is comprised of various non-skin material such as, but not limited to, textiles, plastics, elastics, latex, rubber, etc. Each material is assigned a value, digitalized, and stored in the non-skin material library.

A colorant mix 34 is determined by the software algorithm by comparing the individual color value to the colorants in the colorant library and the selected non-skin material from the non-skin material library. The software takes into consideration the properties of the non-skin material, for example the materials color, porousness, texture, etc. The software then determines which of the colorants are needed and the quantity of each colorant needed to formulate a color match 36.

Data consisting of the chosen colorants and their desired quantities i.e. the color match is then transferred to an electronically coupled computer controlled pumping mixing system 38 such as, but not limited to, for example, a Miller Accutinter 3200, manufactured by Fluid Management. The Accutinter 3200 is a high speed automatic dispenser for fluids. It utilizes an advanced calibration algorithm that models the non-linear fluid properties of a colorant thus providing accuracy at both small and large dispensing. Alternatively, the data may be manually programmed into the pumping mixing system.

The computer controlled pumping mixing system produces enough of the color match to dye the non-skin material 40. In the preferred embodiment, a control test is preformed. A test amount of the non-skin material is dyed, dried, and scanned. The scanned non-skin material test patch is then compared to the individual color value to ensure that the match is exact or within an acceptable variance.

The non-skin material is dyed 42 and dried 44. Once dried, the dyed non-skin material is scanned 46 and a dyed non-skin material color value is retrieved 48, digitalized 50, and inputted to the computer software program 52. The digitalized dyed non-skin material color value is then compared to the individual color value for any variance 54. If there is no variance then the product is finished 56. If there is a variance but the variance is within a predetermined acceptable statistical variance, for example a plus or minus five percent, then the product is finished 56. If there is a variance but the variance is not within the predetermined acceptable range, then the product is rejected 58.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A process for dying a material to match a chosen skin tone color comprising;

scanning a chosen skin tone color to retrieve a value therefore;

assigning a digital value to said retrieved value;

inputting said digital value into a computer based software program wherein said digital value is assigned a color value;

comparing said color value to a predetermined library of colorant values and predetermined library of material values to determine a colorant mix;

formulating a color match from said colorant mix;

transferring data relating to said color match to a computer controlled pumping mixing system;

producing an amount needed of said color match;

dying said material with said amount needed of said color match;

drying said dyed material;

scanning said dyed material to determine dyed material color value and;

comparing said dyed material color value with said skin tone color value to determine if any variance is within a predetermined statistical range.

2. The process of claim 1 wherein said assigning a color value comprises;

scanning the chosen color twice, retrieving two values, digitalizing said two values;

inputting said two digital values into said computer software program;

determining if said two digital values are within an acceptable predetermined statistical range;

if within said acceptable predetermined statistical range then averaging said two digital values to determine said color value;

if not within said acceptable predetermined statistical range then doing a third scan, retrieving a third value, digitalizing said third value, inputting said third digital value into said computer;

determining the closest two values among said two digital values and said third digital value;

averaging said two closest values to determine said color value.

3. The process of claim 2 wherein said predetermined statistical range is a plus or minus five percent.

4. The process of claim 1 wherein said chosen color is an individual's skin tone.

5. The process of claim 1 wherein said retrieved value is obtained by scanning with an optical measurement.

6. The process of claim 5 wherein said optical measurement is a spectrophotometer.

7. The process of claim 1 wherein said software program includes a color matching algorithm.

8. The process of claim 1 wherein said colorant library is comprised of digitalized data for a color range of inks and dyes.

9. The process of claim 1 wherein said material library is digitalized data for a range of materials comprising elastic, plastic, latex, textiles, rubber, and velcro.

10. The process of claim 1 wherein said colorant-mix contains the determined colorants and determined quantity said determined colorants.

11. A process for dying a non-skin material to match an individual's skin tone comprising;

scanning said individual's skin to retrieve a color value therefore;

assigning a digital color value to said retrieved color value;

inputting said digital color value into a computer based software program wherein said digital color value is assigned an individual color value;

comparing said individual color value to a predetermined library of colorant values and predetermined library of non-skin material values to determine a colorant mix;

formulating a color match from said colorant mix;

transferring data relating to said color match to a computer controlled pumping mixing system;

producing an amount needed of said color match;

dying said non--skin material with said amount needed of said color match;

drying said dyed non-skin material;

scanning said dyed non-skin material to determine dyed non-skin material color value and;

comparing said dyed non-skin material color value with said skin color value to determine if any variance is within a predetermined statistical range.

12. The process of claim 11 wherein said assigning an individual color value comprises;

scanning the individual's skin twice, retrieving two color values, digitalizing said two color values;

inputting said two digital color values into said computer software program;

determining if said two digital color values are within an acceptable predetermined statistical range;

if within said acceptable predetermined statistical range then averaging said two digital color values to determine said individual color value;

if not within said acceptable predetermined statistical range then doing a third scan, retrieving a third color value, digitalizing said third color value, inputting said third digital color value into said computer software program;

determining the closest two values among said two digital color values and said third digital color value;

averaging said two closest values to determine said individual color value.

13. The process of claims 12 wherein said predetermined statistical range is a plus or minus five percent.

14. The process of claim 11 wherein said retrieved color value is obtained by scanning with an optical measurement.

15. The process of claim 11 wherein said optical measurement is a spectrophotometer.

16. The process of claim 11 wherein said colorant library is comprised of digitalized data for a color range of inks and dyes.

17. The process of claim 11 wherein said non-skin material library is digitalized data for range of non-skin materials comprising elastic, plastic, latex, textiles, rubber, and velcro.

18. The process of claim 11 wherein said colorant mix contains the determined colorants and determined quantity of said determined colorants.

* * * * *